United States Patent
Sugiyama et al.

(10) Patent No.: US 9,815,106 B2
(45) Date of Patent: Nov. 14, 2017

(54) BUFFER TURRET APPARATUS

(71) Applicant: AMADA COMPANY, LIMITED, Kanagawa-ken (JP)

(72) Inventors: Keiichi Sugiyama, Kanagawa (JP); Syuuji Ishida, Kanagawa (JP); Tomotake Iwamoto, Kanagawa (JP); Youichi Tanaka, Kanagawa (JP)

(73) Assignee: AMADA COMPANY, LIMITED, Kanagawa-Ken (JP)

( * ) Notice: Subject to any disclaimer, the term of this patent is extended or adjusted under 35 U.S.C. 154(b) by 330 days.

(21) Appl. No.: 14/420,811

(22) PCT Filed: Aug. 5, 2013

(86) PCT No.: PCT/JP2013/071133
§ 371 (c)(1),
(2) Date: Feb. 10, 2015

(87) PCT Pub. No.: WO2014/027582
PCT Pub. Date: Feb. 20, 2014

(65) Prior Publication Data
US 2015/0202676 A1  Jul. 23, 2015

(30) Foreign Application Priority Data
Aug. 16, 2012 (JP) .................. 2012-180360

(51) Int. Cl.
*B21D 37/14* (2006.01)
*B23Q 3/155* (2006.01)
(Continued)

(52) U.S. Cl.
CPC .......... *B21D 37/145* (2013.01); *B21D 28/36* (2013.01); *B21D 37/04* (2013.01); *B23Q 3/1556* (2013.01);
(Continued)

(58) Field of Classification Search
CPC ............. Y10T 483/132; Y10T 483/134; Y10T 483/136; Y10T 483/14; Y10T 483/1729;
(Continued)

(56) References Cited

U.S. PATENT DOCUMENTS 5,046,014 A  9/1991  Anjo
5,318,496 A  6/1994  Takahashi
(Continued)

FOREIGN PATENT DOCUMENTS

JP  05069058 A  *  3/1993
JP  7-136724        5/1995
(Continued)

OTHER PUBLICATIONS

International Search report and Written Opinion of the International Searching Authority, with English language translation of International Search Report, in PCT/JP2013/071133, dated Oct. 29, 2013.
(Continued)

*Primary Examiner* — Sunil K Singh
*Assistant Examiner* — Michael Vitale
(74) *Attorney, Agent, or Firm* — Greenblum & Bernstein, P.L.C.

(57) ABSTRACT

A rotatable buffer turret apparatus on which plural pairs of punches and dies to be set on a turret of a turret punch press are set, includes an upper buffer turret on which punch attachment holes in which the punches can be set are arranged circularly, and a lower buffer turret on which die attachment holes that is associated with the punch attachment holes and in which the dies can be set are arranged circularly. The upper and lower buffer turrets are rotatably attached to a single rotary shaft. A diameter of the lower buffer turret is made larger than a diameter of the upper buffer turret. The die attachment holes are formed in a circular die attachment area having a diameter larger than
(Continued)

the diameter of the upper buffer turret. According to the apparatus, a tool exchange manually operated by an operator can be done easily and efficiently.

3 Claims, 5 Drawing Sheets

(51) Int. Cl.
B21D 28/36 (2006.01)
B21D 37/04 (2006.01)

(52) U.S. Cl.
CPC ............ *Y10T 74/14* (2015.01); *Y10T 483/136* (2015.01); *Y10T 483/14* (2015.01); *Y10T 483/1731* (2015.01); *Y10T 483/1882* (2015.01)

(58) Field of Classification Search
CPC ........ Y10T 483/1731; Y10T 483/1882; B21D 28/36; B21D 37/145
USPC ........................... 483/8, 9, 10, 12, 28, 29, 67
See application file for complete search history.

(56) References Cited

U.S. PATENT DOCUMENTS

| | | | |
|---|---|---|---|
| 5,342,276 A | 8/1994 | Fujiwara et al. | |
| 5,346,454 A | 9/1994 | Hayashi | |
| 5,350,347 A | 9/1994 | Fujiwara et al. | |
| 5,367,935 A | 11/1994 | Matsuda | |
| 5,425,692 A | 6/1995 | Matsuda | |
| 5,451,195 A | 9/1995 | Fujiwara et al. | |
| 5,522,295 A * | 6/1996 | Chun | B21D 28/12 29/36 |
| 5,545,116 A * | 8/1996 | Seto | B21D 28/12 483/29 |
| 5,943,240 A * | 8/1999 | Nakamura | B21D 28/12 483/8 |
| 6,071,220 A * | 6/2000 | Sugihara | B23Q 3/155 483/36 |
| 6,109,159 A | 8/2000 | Seto | |
| 6,163,734 A * | 12/2000 | Shigefuji | B21D 28/12 483/9 |
| 6,344,018 B1 * | 2/2002 | Aizawa | B21D 28/12 483/9 |
| 6,591,726 B1 * | 7/2003 | Perazzolo | B21D 28/12 29/36 |
| 8,001,824 B2 | 8/2011 | Akami et al. | |
| 2008/0269031 A1 | 10/2008 | Lee et al. | |

FOREIGN PATENT DOCUMENTS

| | | |
|---|---|---|
| JP | 2002-153924 | 5/2002 |
| JP | 2009-125781 | 6/2009 |

OTHER PUBLICATIONS

Extended European Search Report in EP 13879435.9, dated Apr. 6, 2016.

\* cited by examiner

BUFFER TURRET APPARATUS

TECHNICAL FIELD

The present invention relates to a buffer turret apparatus that is disposed between a tool stocker for stocking plural tools (plural pairs of punch and die) and a turret punch press, and exchanges tools at the turret punch press.

BACKGROUND ART

A turret punch press is provided with rotatable turrets (an upper turret and a lower turret). Exchangeable tools (punches and dies) are attached to the turrets. By exchanging the tools, various punching works and pressing works can be made to a plate-shaped workpiece. With respect to an exchange of a tool (punch and die) to be used in a next process, the tool to be used in the next process is prepared, and then the tool to be used in the next process is exchanged when a current process is stopped or after the current process is finished. In order to prepare the tool to be used in the next process, a buffer turret apparatus is disposed in a turret punch press or near a turret punch press (see, a Patent Document 1 listed below).

PRIOR ART DOCUMENT

Patent Document

Patent Document 1: Japanese Patent Application Laid-Open No. 2009-125781.

SUMMARY OF INVENTION

In a buffer turret apparatus disclosed in the Patent Document 1, exchanging tools with a turret punch press is done by a first auto tool changer. In addition, exchanging tools with a tool stocker that stores many tools is done by a second auto tool changer. Namely, it is not taken into consideration that exchanging tools with the buffer turret apparatus is done by an operator.

Therefore, it is not easy for an operator to exchange tools with the buffer turret apparatus manually. In addition, in exchanging tools with the buffer turret apparatus manually by an operator, if the operator doesn't see documented work instructions, he/she cannot discriminate tools to be selected from others. As a result, exchanging tools with the buffer turret apparatus manually by an operator is difficult and inefficient.

An object of the present invention is to provide a buffer turret apparatus by which a tool exchange manually operated by an operator can be done easily and efficiently.

An aspect of the present invention provides a rotatable buffer turret apparatus on which plural pairs of punches and dies to be set on a turret of a turret punch press are set, the apparatus comprising: an upper buffer turret on which a plurality of punch attachment holes in which the punches can be set are arranged circularly; and a lower buffer turret on which a plurality of die attachment holes that is associated with the plurality of punch attachment holes and in which the dies can be set are arranged circularly, wherein the upper buffer turret and the lower buffer turret are rotatably attached to a single rotary shaft, a diameter of the lower buffer turret is made larger than a diameter of the upper buffer turret, and the plurality of die attachment holes is formed in a circular die attachment area having a diameter larger than the diameter of the upper buffer turret.

Here, it is preferable that a status indicator that indicates a status of a punch and a die set in a punch attachment hole and a die attachment hole that are served as a pair is provided near each of at least one of the plurality of punch attachment holes and the plurality of die attachment holes.

It is preferable that the status indicator includes an LED switch that illuminates with a plurality of colors including a first color and a second color, and is configured to indicate the status of the punch and the die by an indication status thereof made by combination of lighting-up and blinking of the first color and lighting-up and blinking of the second color.

Further, it is preferable to comprise further an indication status controller that controls the indication status of the LED switch, and a comparator that compares data with respect to a tool to be exchanged with data with respect to a tool set on the buffer turret apparatus, wherein the indication status controller controls the status indicator to indicate, as a comparison result of the comparator, a status whether or not the punch and the die set in the punch attachment hole and the die attachment hole is exchangeable, as the status of the punch and the die.

In addition, it is preferable to comprise further an ID reader that read an ID marked on the punch and the die is provided on a conveying path of the punch and the die from the upper buffer turret and the lower buffer turret to the turret punch press, or near the conveying path.

DESCRIPTION OF EMBODIMENTS

Figure 1:
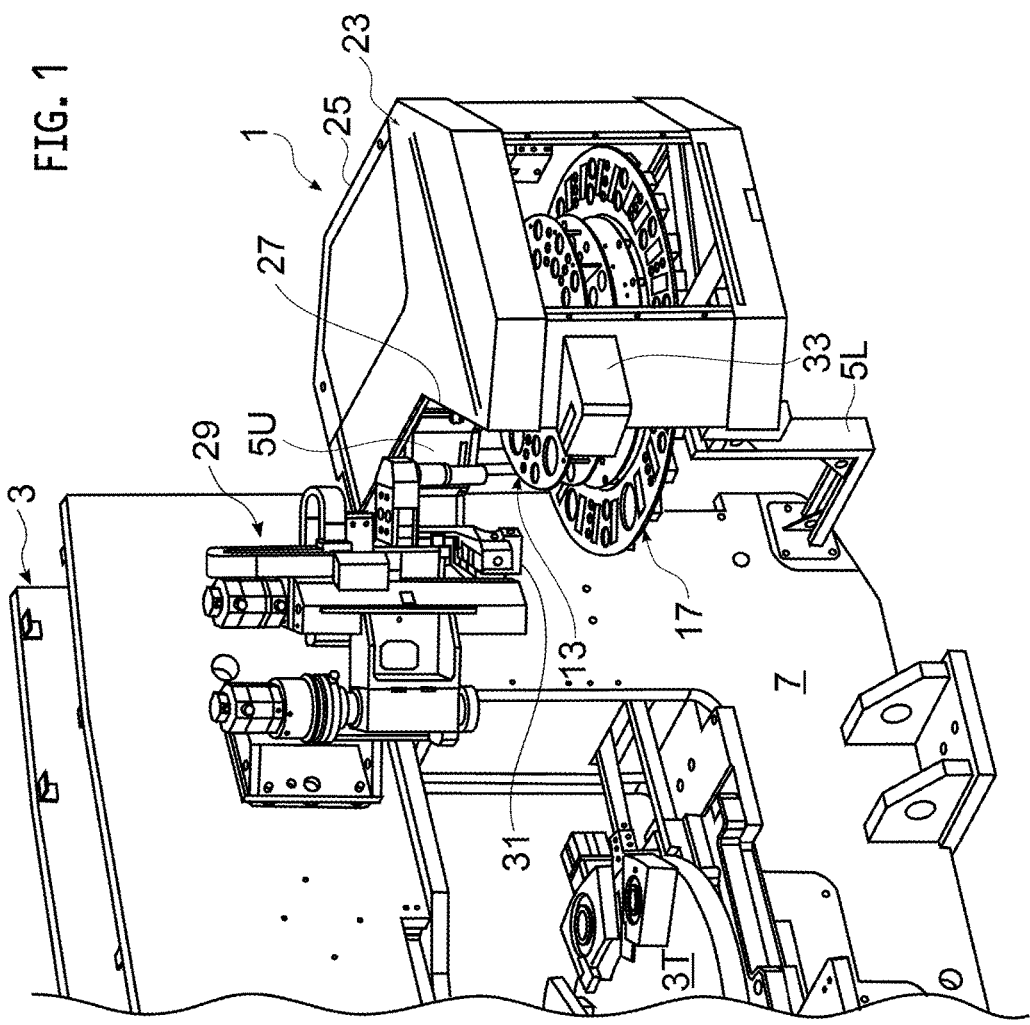
FIG. 1 It is a partial perspective view of a buffer turret apparatus according to an embodiment and a turret punch press provided with an auto tool changer.

As shown in FIG. 1, a buffer turret apparatus 1 according to the present embodiment is attached to a turret punch press 3. Since the turret punch press 3 has popular configurations, detailed explanations for its configurations and its operations will be omitted.

In the buffer turret apparatus 1, a base end of its support bracket 5U is fixed with a frame 7 of the turret punch press 3 by bolts. Note that the buffer turret apparatus 1 may be disposed near the turret punch press 3 without being attached to the turret punch press 3.

Figure 2:
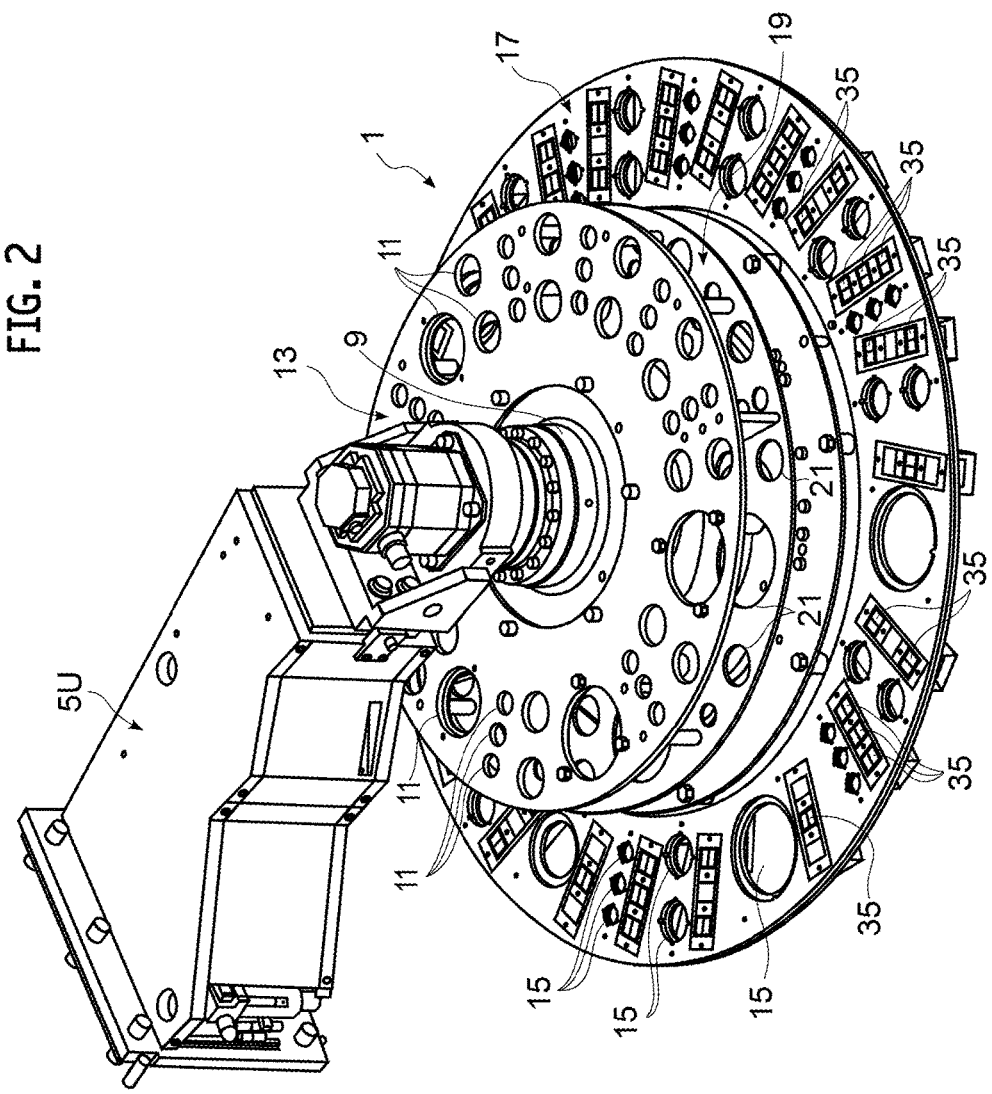
FIG. 2 It is a perspective view of the buffer turret apparatus.
Figure 3:
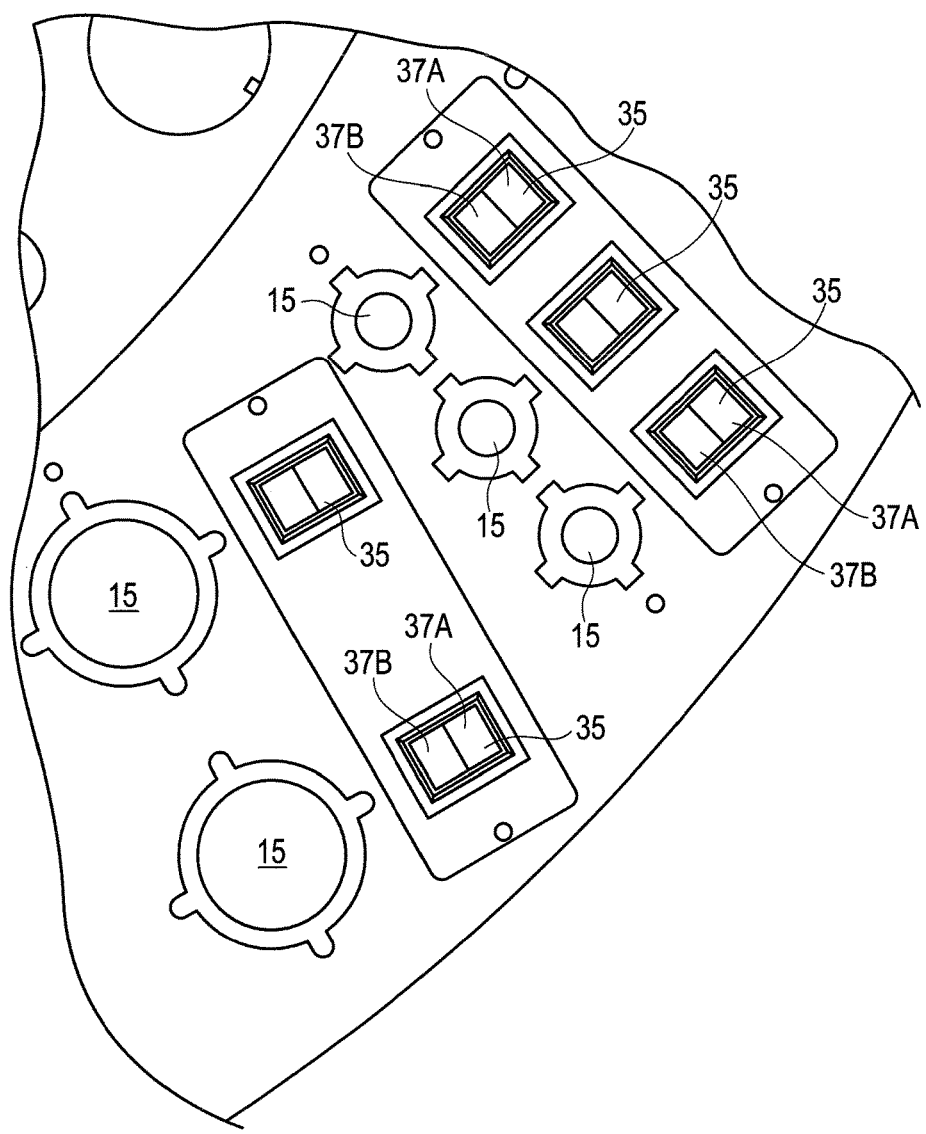
FIG. 3 It is a plan view showing a positional relation between die attachment holes and status indicators in the buffer turret apparatus.
Figure 4:
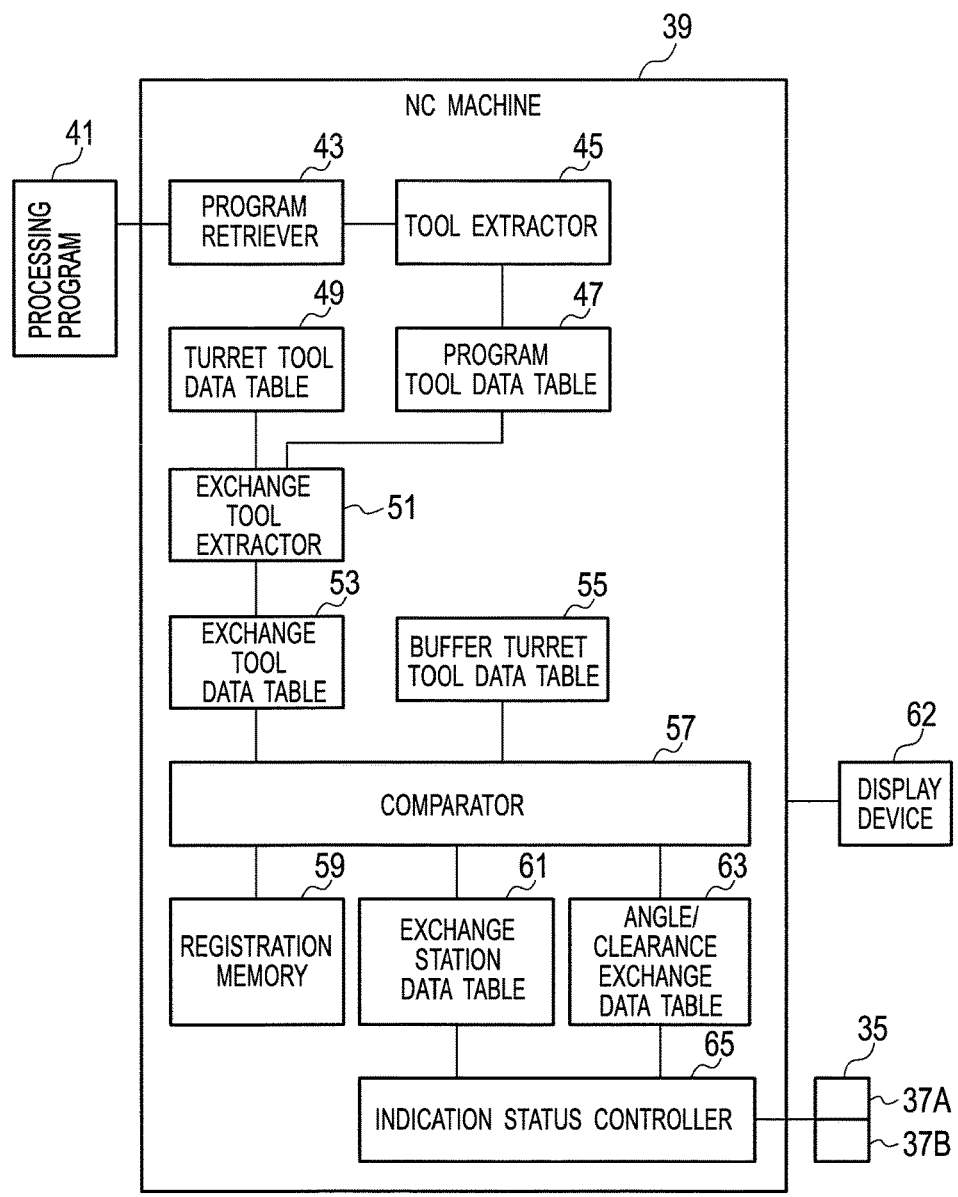
FIG. 4 It is a functional block diagram of the buffer turret apparatus.
Figure 5:
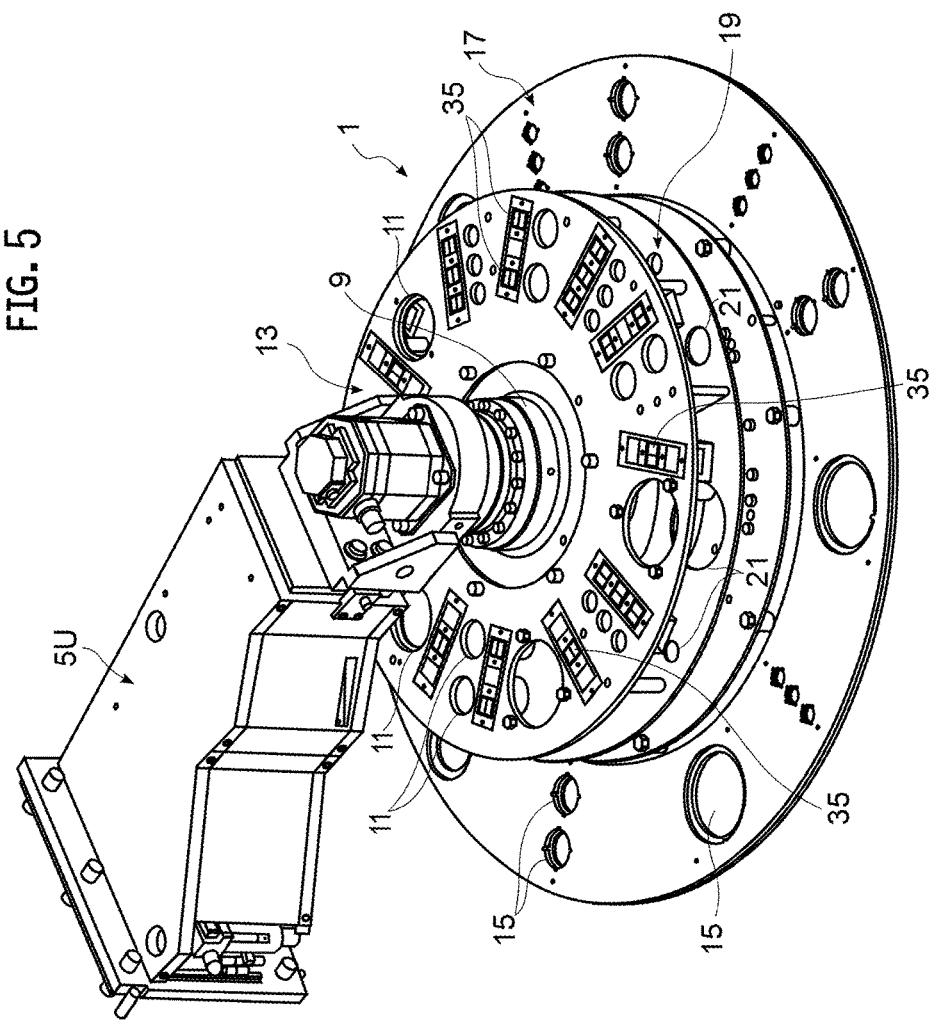
FIG. 5 It is a plan view showing a positional relation between punch attachment holes and status indicators in the buffer turret apparatus.

As shown in FIG. 2, the buffer turret apparatus 1 includes a vertical rotary shaft 9 rotatably supported at a distal end of the support bracket 5U. An upper buffer turret on which plural punch attachment holes 11 are arranged circularly is attached to the rotary shaft 9. In addition, a lower buffer turret 17 on which plural die attachment holes 15 are arranged circularly is also attached to the rotary shaft 9 below the upper buffer turret 13.

Namely, the upper buffer turret 13 and the lower buffer turret 17 are attached to the rotary shaft 9 so as to be distanced vertically from each other. In addition, a support circular plate 19 having a diameter equal to that of the upper buffer turret 13 is attached to the upper buffer turret 13 below the upper buffer turret 13 and above the lower buffer turret 17. The support circular plate 19 restrains dangling of a lower end of a punch(es) when the punch is set in the punch attachment hole 11 of the upper buffer turret 13. Therefore, punch restraint holes 21 are formed on the support circular plate 19 so as to be associated with the punch attachment holes 11. In addition, a key that engages with a key slot provided on an outer circumference of the punch(es) is protruded from an inner edge of the punch restraint hole(s) 21 to restraint rotations of a punch in the punch attachment hole(s) 11.

Therefore, when rotating a tool (punch and die) held on the buffer turrets 13 and 17 to a desired rotational position by rotating the rotary shaft 9 by a servomotor (not shown), dangling of an lower end of the punch(es) is effectively prevented by the punch restraint hole(s) 21 of the support circular plate 19, and rotations of the punch(es) in the punch attachment hole(s) 11 are effectively restrained by the key slot and the key. Namely, the buffer turrets 13 and 17 can be rotated rapidly to their desired rotational position.

As shown in FIG. 1, the buffer turrets 13 and 17 are supported by the support bracket 5U, and are covered by a cover frame 23 attached to a lower support bracket 5L. On the cover frame 23, provided is a door 25 that is opened when tools (punches and dies) are to be set-on or removed-from the upper buffer turret 13 and the lower buffer turret 17. In addition, an opening 27 is formed on the cover frame 23 on its portion on a side of a turret 3T of the turret punch press 3.

As shown in FIG. 2, in order to set tools (punches and dies) on or to remove them from the buffer turrets 13 and 17 easily, a diameter of the lower buffer turret 17 is made larger than the diameter of the upper buffer turret 13. In order not to make a die(s) contacted with the upper buffer turret 13 when setting the die(s) on or removing it from the upper buffer turret 13, the plural die attachment holes 15 formed on the lower buffer turret 17 are arranged outward from an outer circumference of the upper buffer turret 13. Namely, the plural die attachment holes 15 are formed in a circular die attachment area having a diameter larger than that of the upper buffer turret 13. Therefore, an operator can operate his/her works easily when he/she opens the door 25 and then manually sets tools (punches and dies) on or manually removes them from the buffer turrets 13 and 17.

As shown in FIG. 1, an auto tool changer 29 is provided between the buffer turret apparatus 1 and the turret 3T of the turret punch press 3 in order to exchange tools (punches and dies) between the buffer turret apparatus 1 and the turret 3T. The auto tool changer 29 is configured of a robot arm in which plural horizontally swingable arms are jointed, and is attached to a side surface of the frame 7. Then, a tool gripper 31 that is horizontally and vertically movable is attached to a distal end of the robot arm.

Note that the auto tool changer 29 is not limited to the auto tool changer having the above-explained configurations, but an auto tool changer having arbitrary configurations may be adopted. In addition, since configurations of the robot arm in which the plural swingable arms are jointed are commonly known, more detailed explanations for the auto tool changer 29 are omitted.

Exchanging of tools between the buffer turret apparatus 1 and the turret 3T is done by the auto tool changer 29. In addition, in the present embodiment, an ID reader 33 (see, FIG. 1) that can read an ID tag or an ID code marked on a tool(s) (punch and die) to be conveyed by the auto tool changer 29 is provided near the opening 27 of the cover frame 23. Namely, the ID reader 33 is disposed on a conveying path of a tool(s) (punch and die) from the buffer turrets 13 and 17 to the turret 3T, or near the conveying path.

Therefore, a tool to be exchanged between the buffer turret apparatus 1 and the turret 3T is conveyed to the ID reader 33 by the auto tool changer 29, and then its ID tag or ID code is read by the ID reader 33. Namely, it can be possible to verify whether a tool(s) conveyed by the auto tool changer 29, i.e. newly set on the buffer turret apparatus 1, is valid or invalid.

At a position associated with each of the punch attachment holes 11 on the upper buffer turret 13 or a position associated with each of the die attachment holes 15, a status indicator 35 that indicates a status of a tool (punch and die) set in the punch attachment hole 11 and the die attachment hole 15 provided as a pair. The status indicator 35 in the present embodiment is configured of a commercially available LED switch.

The LED switch 35 includes a first switch 37A that illuminates with a first color (yellow in the present embodiment), and a second switch 37B that illuminates with a second color (blue in the present embodiment). The first switch 37A and the second switch 37B can be lighted-up/blinked independently from each other. Of course, the first switch 37A and the second switch 37B can be also lighted-up/blinked simultaneously. Therefore, the LED switch (status indicator) 35 can indicate a first status where only the first switch 37A is lighted up, a second status where only the first switch 37A is blinked, a third status where only the second switch 37B is lighted up, a fourth status where only the second switch 37B is blinked, a fifth status where the first switch 37A and the second switch 37B are lighted up, and a sixth status where the first switch 37A and the second switch 37B are blinked.

When setting a tool to be used in a next process on the buffer turret apparatus 1, it is indicated, by lighting the first switch 37A (indicating the first status) of the LED switch 35 associating with the attachment holes 11 and 15 holding an exchangeable (removable) tool, that the tool (punch and die) in the attachment holes 11 and 15 is exchangeable. In addition, the LED switch 35 associated with empty attachment holes 11 and 15 holding no tool also indicates the first status. Then, when a new tool is set in the attachment holes 11 and 15 after removing a tool from them, or when a new tool is set in empty attachment holes 11 and 15, the first switch 37A is blinked (indicates the second status) to notify exchange completion of the tool in the attachment holes 11 and 15.

In addition, when the third status is indicated by lighting a second switch 37B, a tool set in the attachment holes 11 and 15 associated with the second switch 37B is a tool whose set angle or die clearance should be changed. Then, after its set angle or die clearance is changed, an operator blinks the second switch 37B (indicates the fourth status) to notify change completion of its set angle or die clearance.

In addition when a tool whose ID tag or ID code is read by the ID reader 33 differs from a tool preliminarily registered in a registration memory 59 of an NC machine 39, the first switch 37A and the second switch 37B are lighted up (indicate the fifth status) to notify that the tool is invalid. Note that the registration in the registration memory 59 will be explained later in detail. The indication of the fifth status notifies that re-verification by using the ID reader 33, i.e. whether or not an exchanged tool is a valid tool registered in the registration memory 59, is to be done repeatedly until the valid tool is set in the attachment holes 11 and 15.

On the other hand, when a tool whose ID tag or ID code is read by the ID reader 33 is a tool preliminarily registered in a registration memory 59 of the NC machine 39, the first switch 37A and the second switch 37B are turned off to notify that the tool is valid and is not needed to be exchanged (is prevented from being exchanged). Namely, the extinctions of the first switch 37A and the second switch 37B indicates a status where a valid tool whose set angle or whose die clearance are not needed to be exchanged is set in the attachment holes 11 and 15.

Note that combinations of indication modes for the first to sixth statuses by the first switch 37A and the second switch 37B and statuses of a tool (e.g. need to be exchanged/no need to be exchanged) can be set arbitrarily.

An NC machine 39 that controls operations of the turret punch press 3, the buffer turret apparatus 1 and the auto tool changer 29 is provided. The NC machine 39 is configured of a computer, and includes a program retriever 43 for retrieving a processing program 41 and tool information to be used by the processing program 41. When the processing program 41 is retrieved, a tool extractor 45 extracts a tool(s) (punch and die) to be used, and a program tool data table 47 that defines a relation(s) between a tool number(s) of the extracted tool(s) and a turret station number(s) of the turret 3T to which the tool extracted tool(s) is to be set, is generated.

Further, the NC machine 39 also includes a turret tool data table 49 that defines a relation(s) between a tool number(s) of a tool(s) already set on the turret 3T and its turret station number(s) of the turret 3T. Then, the NC machine 39 includes an exchange tool extractor 51 that compares the program tool data table 47 with the turret tool data table 49 and thereby extracts (1) a tool(s) that is set on the turret 3T but is not to be used, (2) a tool(s) that is set on the turret 3T and is to be used, and (3) a tool(s) that is not set on the turret 3T but is to be used. When the above-explained tools (1) to (3) are extracted by the exchange tool extractor 51, an exchange tool data table 53 is generated.

In addition, in the NC machine 39, a buffer turret tool data table 55 that defines a relation(s) between a tool numbers of a tool(s) set on the buffer turret apparatus 1 and a station number of the buffer turrets 13 and 17 at which the tool(s) is set, is preliminarily stored. Then, the buffer turret tool data table 55 and the exchange tool data table 53 are compared with each other by a comparator 57.

As a result of the comparison by the comparator 57, if a tool(s) (3) that is not set on the turret 3T but is to be used is set on the buffer turrets 13 and 17 among the extracted tools by the exchange tool extractor 51, its tool number(s) is related to the station number(s) of the buffer turrets 13 and 17 and then is registered in the registration memory 59.

In addition, as a result of the comparison by the comparator 57, if a tool(s) (3) that is not set on the turret 3T but is to be used is not defined in the buffer turret tool data table 55 (i.e. it is needed to be picked up from a tool stocker), an exchange station data table 61 that defines a relation between a tool number(s) of the tool(s) and a station number(s) of the buffer turrets 13 and 17 (empty, or a exchangeable tool(s) is set thereon), is generated. The exchange station data table 61 is displayed on a display device 6, and thereby an operator can recognize the tool number(s) of the tool(s) to be set and the station number(s) of the buffer turrets 13 and 17 at which the tool(s) should be set.

Further, as a result of the comparison by the comparator 57, if a tool(s) (3) that is not set on the turret 3T but is to be used is already set on the buffer turrets 13 and 17 and its set angle or die clearance should be changed when setting it on the turret 3T, an angle/clearance change data table 63 that defines a relation between a tool number(s) of the tool(s) and a station number(s) of the buffer turrets 13 and 17 at which the tool(s) is already set, is generated. The angle/clearance change data table 63 is also displayed on the display device 6.

In addition, the NC machine 39 includes an indication status controller 65. The indication status controller 65 lights up the first switch(es) 37A of the related status indicator(s) 35 based on the exchange station data table 61. In addition, the indication status controller 65 lights up the related second switch(es) 37B based on the angle/clearance change data table 63.

Therefore, when retrieving the processing program 41 and then perform the next pressing work, an operator can recognize that a punch and a die set on the attachment holes 11 and 15 whose first switch 37A of the status indicator 35 is lighted up is exchangeable (removal, or the attachment holes 11 and 15 are empty). Then, the operator can recognize the tool number(s) to be set in the punch attachment hole(s) 11 and the die attachment hole(s) 15 by referring the display device 62, and can exchange it accurately and easily after picking up the tool(s) (punch and die) to be set in the punch attachment hole(s) 11 and the die attachment hole(s) 15 from the tool stocker.

After setting the new tool(s) in the attachment holes 11 and 15 whose first switch 37A is lighted up, the operator pushes the first switch 37A (or, inputs an exchange completion of the tool(s) by using another input device) to put the first switch 37A into a blinking state. By blinks of the first switch 37A, the exchange completion of the tool(s) (transfer of the tool(s) from the tool stocker to the buffer turrets 13 and 17) can be indicated in an easy-to-recognize manner.

In addition, a tool(s) set in the attachment holes 11 and 15 whose second switches are lighted-up needs a change of its set angle or its die clearance. Therefore, after changing the set angle or the die clearance with referring to the display device 62 and resetting the tool(s) to the attachment holes 11 and 15, the operator pushes the second switch 37B (or, inputs a change completion of the set angle or the die clearance) to put the second switch 37B into a blinking state. By blinks of the second switch 37B, the change completion of the set angle or the die clearance can be indicated in an easy-to-recognize manner.

The first switch 37A of the attachment holes 11 and 15 in which a new tool(s) is set is in the blinking state, and it will be verified whether the tool(s) is valid or invalid. Therefore, the tool(s) (punch and die) in the attachment holes 11 and 15 whose second switch 37B is blinked is picked up by the auto tool changer 29 and its ID tag or ID code is read by the ID reader 33. The read ID tag or ID code is checked against the program tool data table 47, and, when the tool(s) is valid, its tool number(s) is related to the station number(s) of the buffer turrets 13 and 17 and then is registered in the registration memory 59. In addition, when the tool(s) is invalid as a result of the check, both the first switch 37A and the second switch 37B are lighted up to indicate that the tool(s) is invalid, and checking is continued until it is exchanged with a valid tool(s). When a valid tool(s) is set conclusively, its tool number(s) is related to the station number(s) of the buffer turrets 13 and 17 and then is registered in the registration memory 59.

As explained above, the station number(s) of the buffer turrets 13 and 17 (the attachment holes 11 and 15) and the tool number(s) of the valid tool(s) are registered in the registration memory 59 while they are related to each other.

Then, press works are processed according to the processing program 41. First, based on contents registered in the registration memory 59, the buffer turrets 13 and 17 are rotated and a tool(s) to be conveyed by the auto tool changer 29 is picked up from the buffer turret 13 and 17. The picked-up tool(s) is set on the turret 3T (or exchanged with a tool(s) set on the turret 3T) by the auto tool changer 29.

When exchanging tools between the turret 3T and the buffer turret apparatus 1 by the auto tool changer 29, the tool to be exchanged is preliminarily verified as being valid by the ID reader 33 as explained above. Therefore, the auto tool changer 29 can be operated smoothly, and thereby a tool exchange can be done rapidly. As a result, time required for the tool exchange can be shortened, and an operation rate of the turret punch press 3 can be improved.

According to the present embodiment, the lower buffer turret 17 has a diameter larger than that of the upper buffer turret 13, and includes the die attachment holes 15 in the circular die attachment area on an outside of the upper buffer turret 13. Therefore, setting of a tool(s) (punch and die) on the upper buffer turret 13 and the lower buffer turret 17 and removing of the tool(s) from them can be done easily.

In addition, according to an indication status of the status indicator(s) 35 at a position associated with a tool(s) to be newly exchanged, an operator can recognize exchange necessity of tools and so on, and thereby can exchange the tool(s) easily.

The present invention is not limited to the above embodiment, and can be done in another embodiment with an adequate modification. For example, a liquid crystal display or the like may be provided as a status indicator(s) instead of the first switch 37A and the second switch 37B, and a tool number(s) of a tool(s) to be newly set and so on may be indicated on the liquid crystal display. In addition, it is possible to manage punches and dies independently from each other by providing status indicators 35 also on the upper buffer turret 13 in addition to the status indicators 35 provided on the lower buffer turret 17. According to these configurations, it is possible to confirm tools to be newly set based on indications of the status indicators 35, and thereby tools can be avoided from being erroneously set.

In addition, it is also possible to notify plural station numbers of the attachment holes 11 and 15 to which tools to be newly set can be set, by lighting-up switches thereof. In this case, only if an operator sets a tool in any of the attachment holes 11 and 15 whose switch is lighted-up and makes the switch blinked, its tool number and its station number are related to each other and registered in the registration memory 59 by using its ID tag or ID code. Therefore, the operator can easily find the attachment holes 11 and 15 in which a tool(s) should be set, and thereby can do his/her operations without any restraint (freely).

In addition, in the NC machine 39 in the above embodiment, the comparison (the exchange tool extractor 51) between the turret tool data table 49 and the program tool data table 47 and the comparison (the comparator 57), via the exchange tool data table 53, between the buffer turret tool data table 55 and the program tool data table 47 are made separately. However, a tool number(s) of a tool(s) to be newly set and a station number(s) of a tool(s) that is set on the turret 3T or on the buffer turrets 13 and 17 but is not to be used may be extracted based on a comparison between a tool data table (49+55) made by integrating the turret tool data table 49 and the buffer turret tool data table 55 with other and the program tool data table 47.

The invention claimed is:

1. A rotatable buffer turret apparatus on which plural pairs of punches and dies to be set on a turret of a turret punch press are set, the apparatus comprising:
   an upper buffer turret on which a plurality of punch attachment holes in which punches, among the plural pairs of punches and dies, can be set are arranged circularly;
   a lower buffer turret on which a plurality of die attachment holes that is associated with the plurality of punch attachment holes and in which dies, among the plural pairs of punches and dies, can be set are arranged circularly;
   a plurality of status indicators, each of which includes a respective light-up indicator, are each configured to indicate a status of one of the plural pairs of punches and dies, where disposed adjacent each of the plurality of punch attachment holes or each of the plurality of die attachment holes is one status indicator of the plurality of status indicators;
   an indication status controller that controls the indication status of each of the respective light-up indicators of the plurality of status indicators; and
   a comparator that compares data of a punch and die pair that is to be exchanged out from the turret of the turret punch press with data of the plural pairs of punches and dies set on the buffer turret apparatus, wherein
   the upper buffer turret and the lower buffer turret are rotatably attached to a single rotary shaft,
   a diameter of the lower buffer turret is made larger than a diameter of the upper buffer turret,
   the plurality of die attachment holes is formed in a circular die attachment area having a diameter larger than the diameter of the upper buffer turret;
   each of the plural pairs of punches and dies are transferred as a pair, and
   the indication status controller controls each of the respective light-up indicators to indicate, as a comparison result of the comparator, the status of the corresponding one of the plural pairs of punches and dies, the status being an indication of whether or not the corresponding one of the plural pairs of punches and dies is exchangeable.

2. The buffer turret apparatus according to claim 1, wherein
   each of the respective light-up indicators is formed as an LED switch that illuminates with a plurality of colors including a first color and a second color, and
   each of the respective light-up indicators is configured to indicate the status of the corresponding one of the plural pairs of punches and dies by a combination of lighting-up and blinking of the first color and lighting-up and blinking of the second color.

3. The buffer turret apparatus according to claim 1, further comprising
   an ID reader that reads an ID marked on each of the plural pairs of punches and dies, and is provided on a conveying path of the plural pairs of punches and dies from the upper buffer turret and the lower buffer turret to the turret punch press, or adjacent the conveying path.

* * * * *

UNITED STATES PATENT AND TRADEMARK OFFICE
CERTIFICATE OF CORRECTION

PATENT NO. : 9,815,106 B2
APPLICATION NO. : 14/420811
DATED : November 14, 2017
INVENTOR(S) : K. Sugiyama et al.

Page 1 of 1

It is certified that error appears in the above-identified patent and that said Letters Patent is hereby corrected as shown below:

In the Claims

Claim 1 (Column 8, Line 36), please change "turret;" to --turret,--.

Signed and Sealed this
Nineteenth Day of June, 2018

Andrei Iancu
*Director of the United States Patent and Trademark Office*